July 26, 1932.  J. R. REPLOGLE  1,869,119
MECHANICALLY REFRIGERATED CABINET
Filed Sept. 8, 1927  2 Sheets-Sheet 2
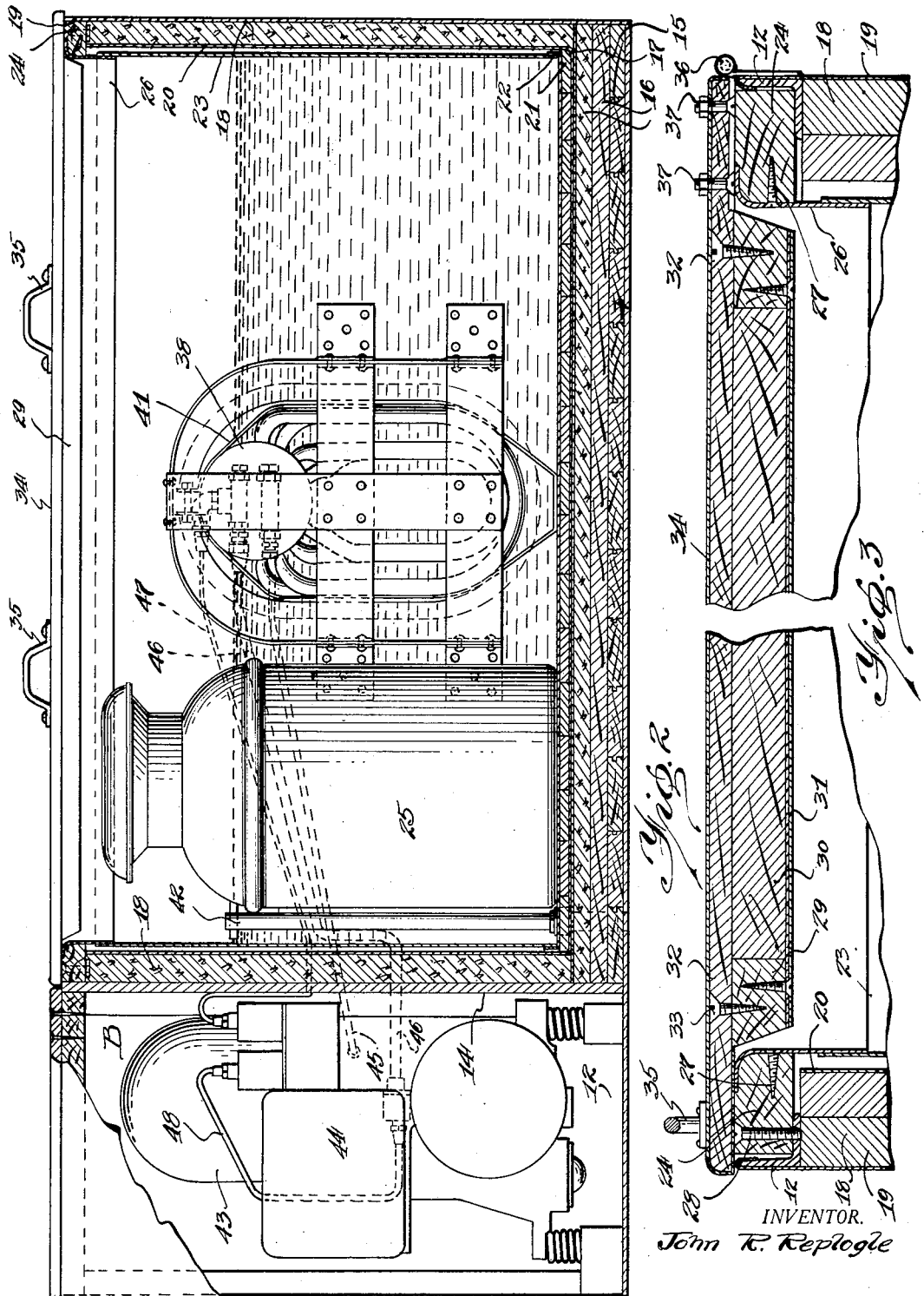
INVENTOR.
John R. Replogle
Hart & Lind
ATTORNEYS.

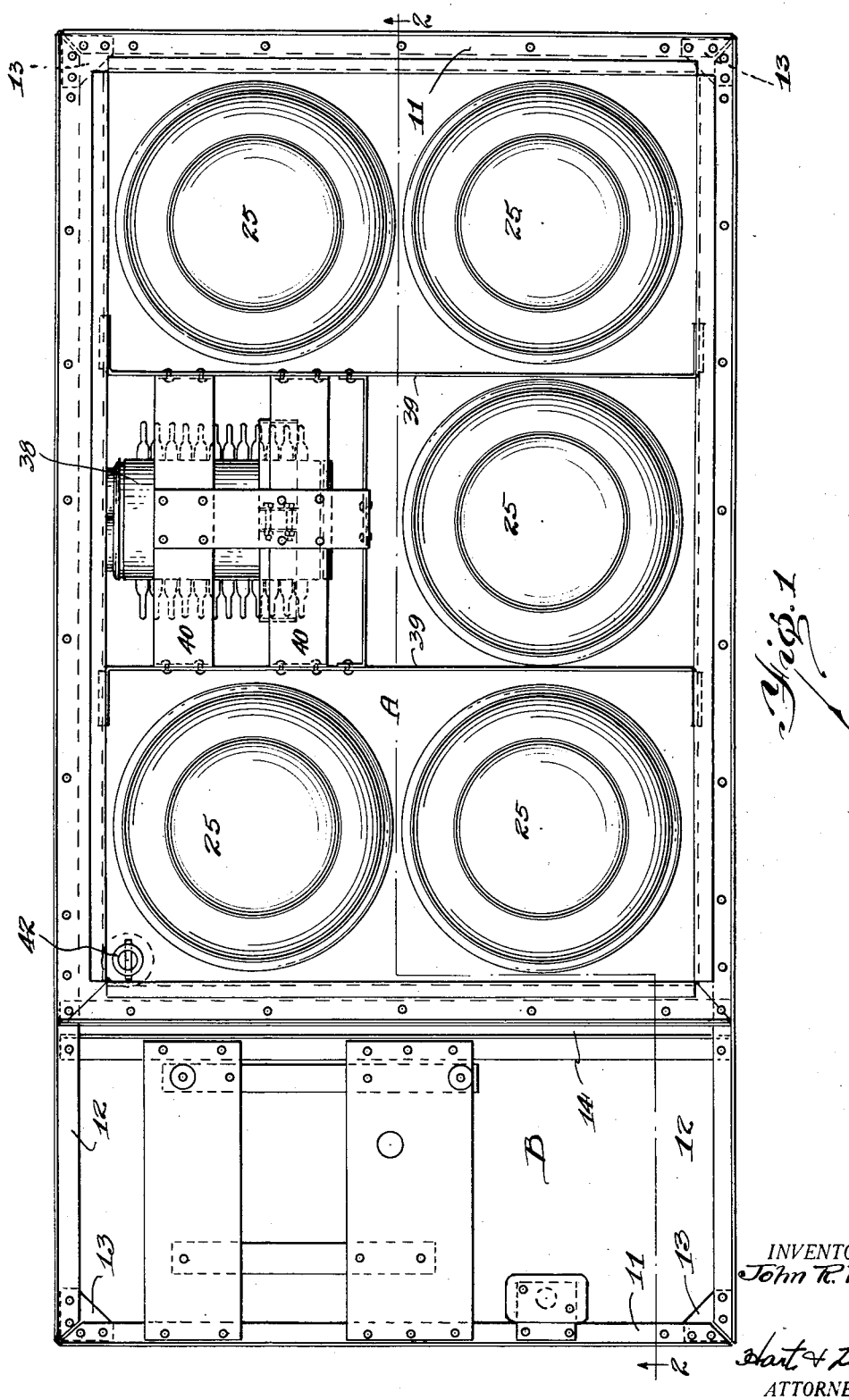

Patented July 26, 1932

1,869,119

UNITED STATES PATENT OFFICE

JOHN R. REPLOGLE, OF DETROIT, MICHIGAN, ASSIGNOR TO KELVINATOR CORPORATION, OF DETROIT, MICHIGAN, A CORPORATION OF MICHIGAN

MECHANICALLY REFRIGERATED CABINET

Application filed September 8, 1927. Serial No. 218,174.

This invention relates to mechanically refrigerated food storage cabinets, and more particularly to mechanically refrigerated cabinets for receiving containers in which food is to be maintained at a given temperature.

An object of my invention is to provide a self contained mechanically refrigerated cabinet in which food containers can be readily inserted and removed, and maintained at a desired temperature by mechanical refrigerating apparatus.

Another object of my invention is to provide a mechanically refrigerated food storage cabinet in which containers can be readily inserted and removed into a liquid heat transferring medium which is maintained at a desired temperature by the evaporator of mechanical refrigerating mechanism.

A further object of my invention resides in the details of construction of a cabinet which is provided with a mechanically refrigerated liquid containing chamber into which food storage containers can be readily inserted or removed.

Other objects of the invention, more or less incidental or ancillary to the foregoing, will appear in the following description which sets forth, in conjunction with the accompanying drawings, a preferred embodiment of the invention.

In the drawings,

Fig. 1 is a top plan view of a mechanically refrigerated cabinet incorporating my invention and having the tops removed.

Fig. 2 is a sectional view of the cabinet taken on line 2—2 of Fig. 1, and including refrigerating mechanism arranged within the machine housing section of the cabinet.

Fig. 3 is a fragmentary sectional view of the cabinet showing the cover and the upper portion of the food storage cabinet.

Referring now to the drawings by characters of reference, 10 represents a cabinet frame formed preferably of top and bottom end angle irons 11, and top and bottom front and rear angle irons 12, the top and bottom angle irons being joined by upright bars 13 to form substantially a rectangular skeleton structure. One end of the frame is provided with insulated walls and forms a food storing chamber A, while the other end of the frame is preferably arranged to form a machinery chamber B. A partition 14 extends transversely across the cabinet and separates the machinery compartment B from the refrigerated food storage compartment A. A flooring 15 is formed of tongue and groove wooden strips which extend across and rest upon the horizontally extending portion of the bottom channel bars of the frame, and superposed layers of insulating material 16 are arranged upon the flooring 15, the insulation layers being formed preferably of cork board. A waterproof sheet material, such as asphalt treated paper or felt 17, is arranged to cover the uppermost of the insulating layers 16. The upper portion of the food storage chamber A is provided with front, rear and end insulation walls 18, which are formed preferably of cork layers, and a sheet metal casing 19 surrounds the cork walls and the entire exterior of the cabinet with the exception of the top. A sheet metal lining 20 is arranged interiorly of the food storage cabinet and rests upon the waterproof sheeting 17 of the bottom wall. A flooring 21 is provided within the lining 20 and a pan 22 rests thereupon. An endless sheet metal sleeve 23 extends into the pan 22 and forms therewith a leak-proof receptacle with an open top for receiving water or a liquid heat transferring refrigerant medium, and food storage receptacles, such as milk cans 25, which are partially submerged in the liquid.

The upper portion of the food storage section of the cabinet is provided with top sills 24 which are bolted to the top angle irons of the frame and against which the top of the lining 20 and the wall sections 21 abut. The sills 24 provide a large opening through which the food storage receptacles can be inserted and removed, and a sleeve member 26 rests upon the upper wall of the sills 24 and depends into the chamber A into engagement with the inner upper portion of the sleeve 23. The sleeve member seals the upper portion of the sleeve 22 so that external atmosphere cannot pass interiorly thereof, and also serves to guard the upper end of the sleeve 23 so that when receptacles are carelessly inserted into the food storage chamber, they will not deform the upper edge thereof. The sleeve member 26 is secured to the walls 24 by the countersunk screws 27, and the walls 24 are secured to the upper angle irons by countersunk bolts 28.

A lid structure is preferably hinged at the rear of the food storage chamber and includes a frame member 29 within which is arranged insulating material 30 which is enclosed by a sheet metal bottom wall 31 secured across the bottom of the frame member 29. An upper frame member 32 adapted to extend across the entire top portion of the refrigerated chamber section of the cabinet is secured to the frame member 29 by screws 33 and is substantially enclosed by the sheet metal casing 34, suitable handles 35 being secured adjacent the front of the top member so that it can be raised or lowered. The upper frame member rests upon the sills 24 and provides a sealed closure when the lid rests thereagainst. A hinge 36 is secured to the rear top sill of the cabinet frame and also to the top frame member by bolts 37.

An evaporator 38 preferably of the flooded type, is located interiorly of the chamber A, and is preferably arranged centrally thereof and adjacent the rear wall. The evaporator is secured within the sleeve 23 by a bracket structure consisting of members 39 which extend transversely across the chamber and are secured at their ends to the front and rear walls of the sleeve 23. Bars 40 extend longitudinally of the cabinet and are secured to the members 39 and suitable clamped bracket members 41 are associated with the bars 40 to rigidly support the evaporator within the cooling chamber. The receptacle consisting of the sleeve 23 and the pan 22 is preferably more than half filled with water, and the evaporator is preferably mounted so that it is substantially submerged within the water and includes a large area of surface for transferring heat from the water refrigerant. With the evaporator arranged as described, a plurality of food containers, such as milk cans, can be stored within the cooling chamber around the evaporator, thus utilizing all possible storage space within the chamber and at the same time permitting a free circulation of brine due to convection. A drain pipe 42 extends vertically within the water containing receptacle to limit the amount of the water which can remain in the chamber and thereby prevent overflow into the top of the storage receptacles, it being understood that water will overflow through the pipe 42 when its level is above the open top thereof. The pipe 42 extends through apertures in the bottom wall of the cabinet and is secured thereto, and suitable connections can be made to a drain or receiver (not shown).

The machinery compartment B is illustrated as a unitary part of the refrigerated cabinets, however, this portion of the cabinet and the machinery therein can be arranged remotely with respect to the refrigerated cabinet if desired. A compressor-condenser unit 43 is mounted within the compartment B and the compressor is operated by an electric motor 44. A conduit 45 leads from the condenser to supply liquid refrigerant to the flooded evaporator 38 and a return conduit 46 connects the evaporator with the crank case of the compressor and provides a connection for the return of the expanded refrigerant to the compressor from the evaporator. A conduit 47 connects the evaporator with the control mechanism for the motor 44 so that the motor can be stopped and started automatically by pressure conditions within the evaporator. A conduit 48 connects the condenser with control mechanism for stopping the motor when a predetermined excessive pressure is present in the condenser. The refrigerating mechanism is preferably of the compressor-condenser evaporator type, and a further description of the refrigerating mechanism will therefore not be required herein.

It will be seen when the lid is raised, that water can be poured into the chamber B, and that the food receptacles 25 can be readily inserted and removed from the chamber. It will be further seen that the supporting means for the evaporator also serves to protect it from the food containers and to also position the containers in the chamber. The cabinet described is self contained and provides a readily accessible refrigerated chamber for storing a plurality of food storage receptacles.

Various changes can be made in the arrangement and construction of the refrigerating apparatus described without departing from the spirit of my invention and the scope of what I claim.

What I claim is:

In a mechanically refrigerated food storage cabinet, a frame structure provided with a heat insulated storage chamber having an open top, an open top liquid containing receptacle in said chamber for storing removable food containers, a lid for closing the top opening in said frame structure, an evaporator in said receptacle for maintaining the liquid at a predetermined temperature, and means in said liquid receptacle for supporting said evaporator and for dividing the receptacle into a plurality of sections for the disposition of food containers.

In testimony whereof I hereunto affix my signature.

JOHN R. REPLOGLE.